(12) United States Patent
Rich

(10) Patent No.: US 7,054,790 B1
(45) Date of Patent: May 30, 2006

(54) METHOD AND APPARATUS FOR STORAGE DEVICE PERFORMANCE MEASUREMENT

(75) Inventor: Phil Rich, San Jose, CA (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 09/574,639

(22) Filed: May 18, 2000

(51) Int. Cl.
 *G06F 11/30* (2006.01)
(52) U.S. Cl. ............... 702/186; 702/123; 702/189; 710/52; 710/58; 710/60; 707/6; 360/78.06; D14/348
(58) Field of Classification Search ............ 702/79–80, 702/123, 179, 182, 183, 186, 189; 710/52, 710/58, 60; 707/6; 360/78.06, 78; D14/348
See application file for complete search history.

(56) References Cited

U.S. PATENT DOCUMENTS

| | | | | |
|---|---|---|---|---|
| 5,383,068 A | * | 1/1995 | Shimizu et al. | 360/78.06 |
| 5,768,617 A | * | 6/1998 | Liu | 710/5 |
| 5,951,700 A | * | 9/1999 | Klein | 714/47 |
| 6,378,013 B1 | * | 4/2002 | Hanson | 710/100 |
| 6,546,456 B1 | * | 4/2003 | Smith et al. | 711/112 |
| 6,741,529 B1 | * | 5/2004 | Getreuer | 369/30.17 |

OTHER PUBLICATIONS

Srikrishna et al., 'Predicting Track Misregistration (TMR) from Disk Vibration of Alternate Substrate Materials', Jan. 2000, IEEE Article, vol. 36, No. 1, pp. 171-176.*
Pentakalos et al., 'Analytical Performance Modeling of Hierarchical Mass Storage Systems', Oct. 1997, IEEE Article, vol. 46, No. 10, pp. 1103-1118.*

* cited by examiner

*Primary Examiner*—Marc S. Hoff
*Assistant Examiner*—Elias Desta

(57) ABSTRACT

Method for measuring performance of a storage device including rotatable media, for storing data to and/or retrieving data from said media via one or more data buffers. The measurement method includes the steps of: specifying one or more access patterns for transferring data to/from the media; and for each access pattern, specifying one or more different required data transfer rates, measuring the actual data transfer time of the storage device for transferring the data according to that access pattern, and determining performance of the storage device in relation to each required data transfer rate based on the actual data transfer time for the data.

40 Claims, 10 Drawing Sheets

THROUGHPUT TESTING

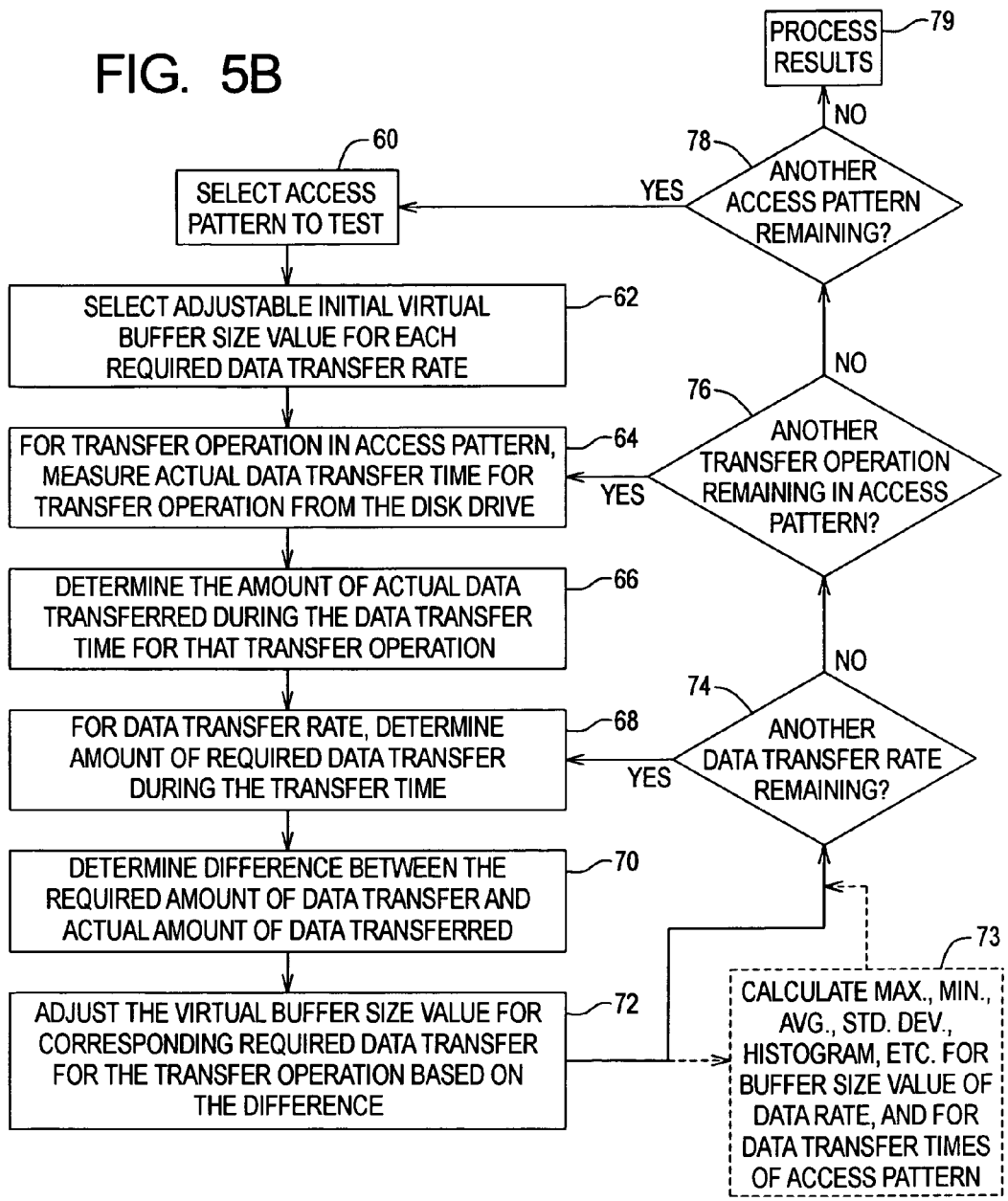

THROUGHPUT TESTING USING VIRTUAL BUFFER MODELS

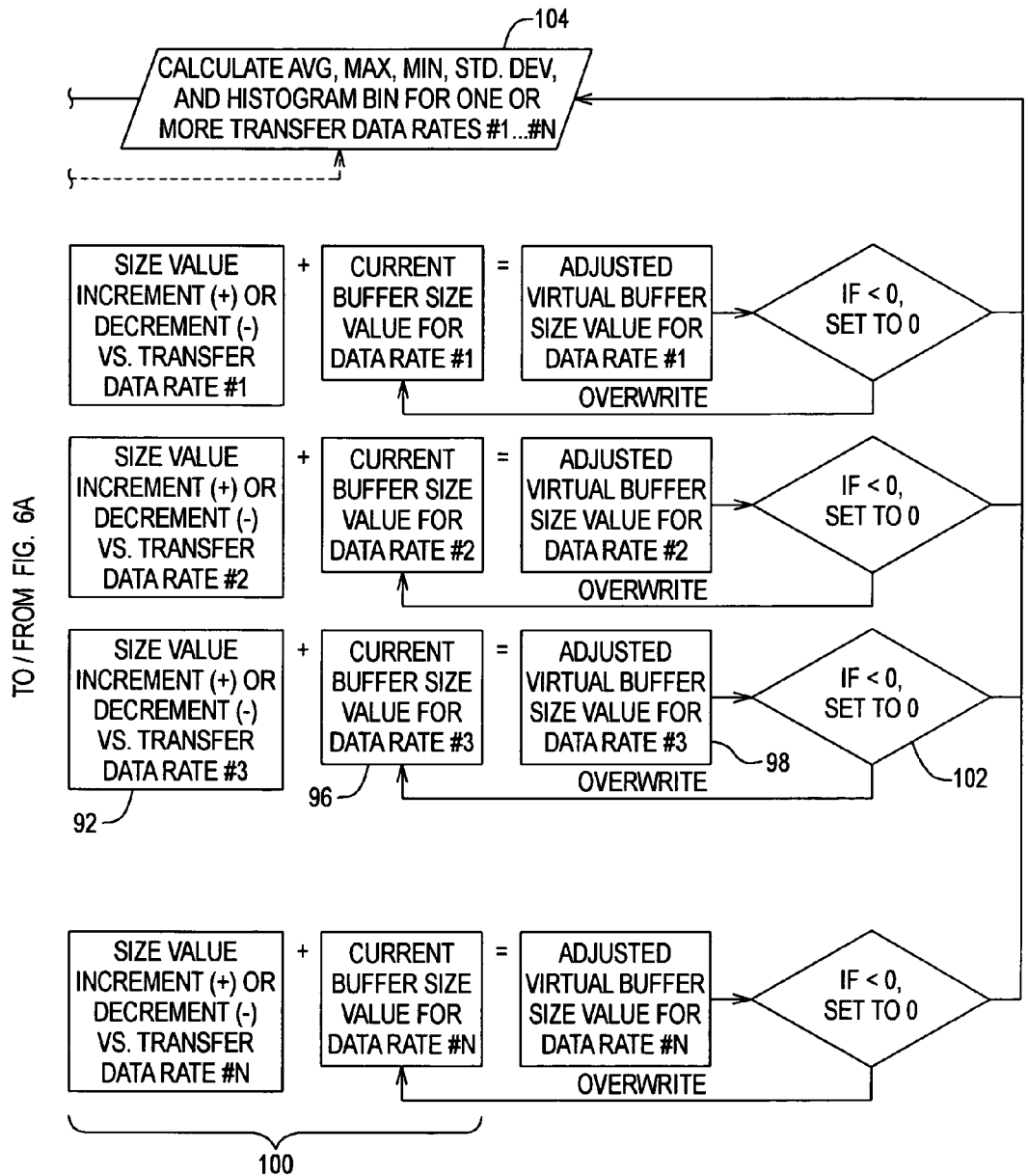

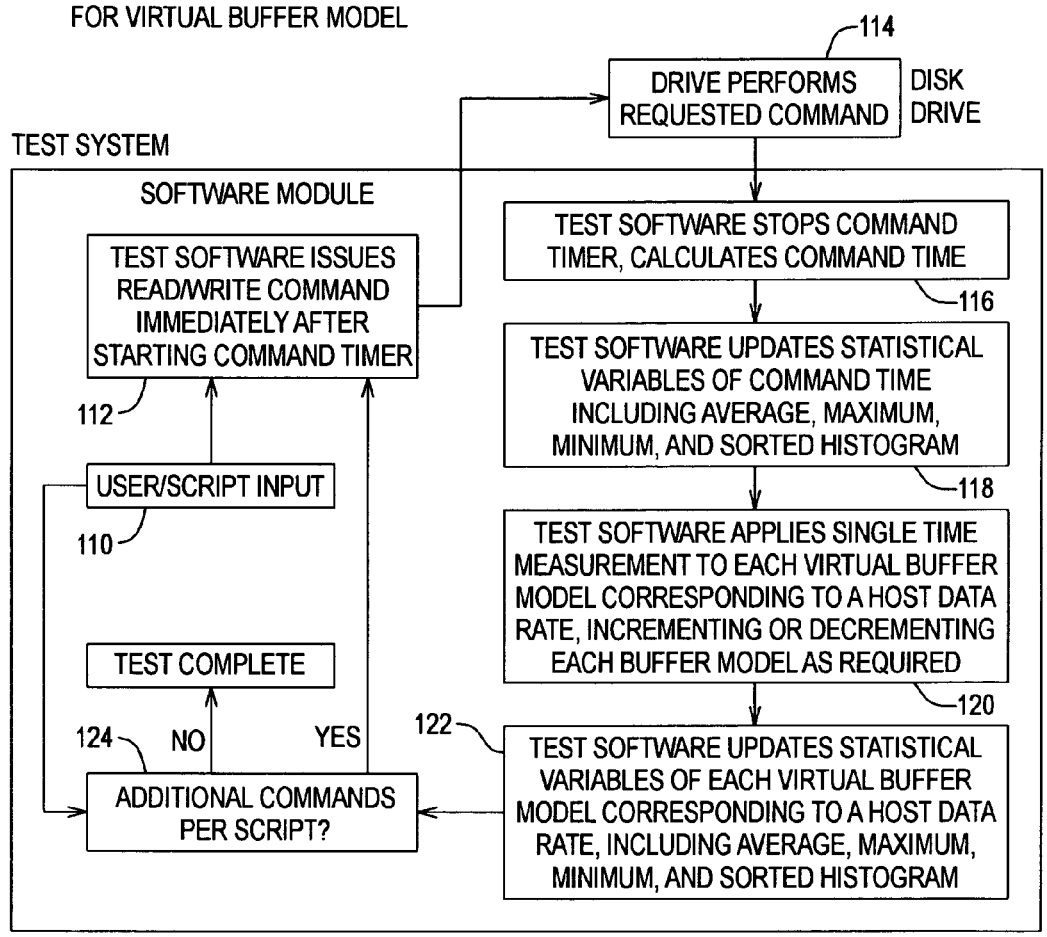

FIG. 8A

TABLE 1

| ACCESS PATTERN | TEST TIME (MINUTES) | RD. OR WRT. | SILENT SEEK | CACHE R&W | nb | TOTAL XFER'S | STREAM1 START |
|---|---|---|---|---|---|---|---|
| OD SEQUENTIAL | 0.7 | WRT. | ON | ON | 256 | 983040 | 0 |
| ID SEQUENTIAL | 0.6 | RD. | ON | ON | 256 | 983040 | maxlba-1500001 |
| ID SEQUENTIAL | 0.7 | WRT. | ON | ON | 256 | 983040 | maxlba-1500001 |
| DUAL STREAM FS | 22.2 | WRT./WRT. | OFF | ON | 4096 | 1572864 | 0 |
| DUAL STREAM O.D. 1/3 | 20.2 | WRT./RD. | OFF | ON | 4096 | 1572864 | 0 |
| DUAL STREAM I.D. 1/3 | 21.2 | WRT./RD. | OFF | ON | 4096 | 1572864 | 2/3 x maxlba |
| RANDOM FS | 1.7 | RD. | OFF | OFF | 256 | 983040 | 0 |
| RANDOM FS | 1.7 | WRT. | OFF | OFF | 256 | 983040 | 0 |
| RANDOM FS | 3.2 | RD. | OFF | ON | 1024 | 3932160 | 0 |

TO / FROM FIG. 8B

FIG. 8B

| STREAM2 | TR 1 | TR 2 | TR 3 | TR 4 | TR 5 | TR 6 | TR 7 | TR 8 | TR 9 | TR 10 | TR 11 | TR 12 | TR 13 | TR 14 | TR 15 | TR 16 | TR 17 | TR 18 |
|---|---|---|---|---|---|---|---|---|---|---|---|---|---|---|---|---|---|---|
| START | | | | | | | | | | | | | | | | | | |
| N/A | | | | | | | | 102 | 100 | 98 | 96 | 94 | 80 | 70 | 60 | 50 | 40 | 30 |
| N/A | | | | | | | | | | | 135 | 130 | 125 | 120 | 100 | 80 | 60 | 40 |
| N/A | | | | | | | | 102 | 100 | 98 | 96 | 94 | 80 | 70 | 60 | 50 | 40 | 30 |
| maxlba-1500001 | | | | | 100 | 98 | 96 | 94 | 92 | 90 | 88 | 86 | 70 | 60 | 50 | 40 | 30 | 20 |
| maxlba/3 | 110 | 108 | 106 | 104 | 102 | 100 | 98 | 96 | 94 | 92 | 90 | 80 | 70 | 60 | 50 | 40 | 30 | 20 |
| maxlba-1500001 | | | | | 100 | 98 | 96 | 94 | 92 | 90 | 88 | 86 | 70 | 60 | 50 | 40 | 30 | 20 |
| maxlba | | | | | | | | | | | | 44 | 42 | 40 | 30 | 25 | 20 | 10 |
| maxlba | | | | | | | | | | | | 44 | 42 | 40 | 30 | 25 | 20 | 10 |
| maxlba | | | | | | 92 | 90 | 88 | 86 | 84 | 82 | 80 | 70 | 60 | 50 | 40 | 30 | 20 |

TO / FROM FIG. 8A

FIG. 9

THROUGHPUT SUMMARY- TABLE 2

| SECTORS PER TRANSFER (ACCESS UNIT) | STREAMING OPERATION | DATA THROUGHPUT PER STREAM (MEGABITS PER SECOND) |
|---|---|---|
| 256 | SEQUENTIAL | 90 Mbps/50 Mbps* |
| | DUAL STREAM | 15 Mbps |
| | RANDOM | 20 Mbps |
| 2048 | SEQUENTIAL | NA |
| | DUAL STREAM | 15 Mbps |
| | RANDOM | 50 Mbps |
| 4096 | SEQUENTIAL | NA |
| | DUAL STREAM | NOT TESTED |
| | RANDOM | 60 Mbps |

* RESULTS INDICATE DATA CACHING ENABLED / DISABLED

THROUGHPUT CRITERIA
> SEQUENTIAL TEST, VIRTUAL BUFFER < 1MB
> DUAL STREAM TESTS, VIRTUAL BUFFER < 2MB (1MB PER STREAM)
> RANDOM TESTS, VIRTUAL BUFFER < 2MB

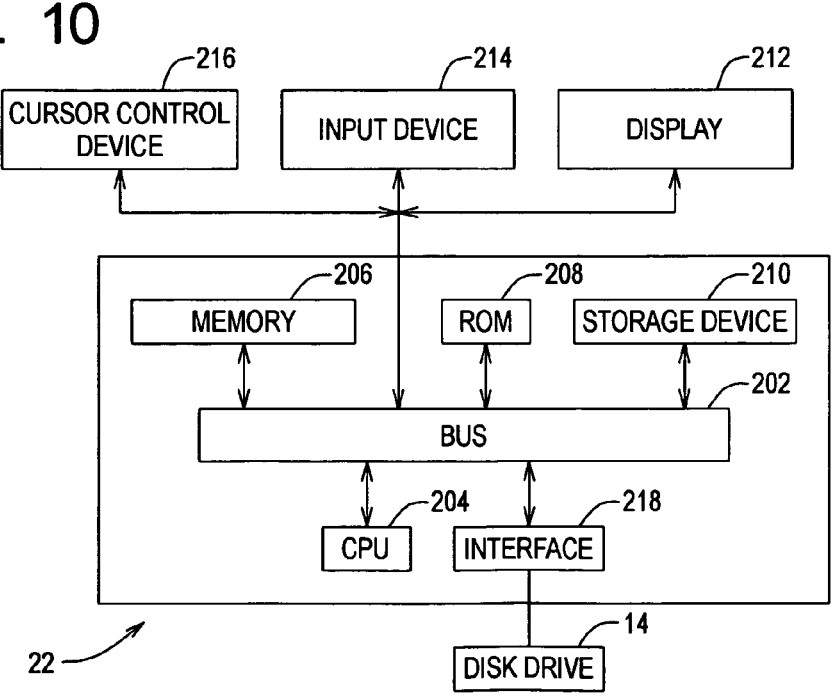

FIG. 10

METHOD AND APPARATUS FOR STORAGE DEVICE PERFORMANCE MEASUREMENT

FIELD OF THE INVENTION

The present invention relates to measuring performance of storage devices for storing and retrieving information, and more particularly, to measuring performance of storage devices for storing and retrieving audio/video information.

BACKGROUND OF THE INVENTION

Storage devices utilizing rotating media, such as hard disk drives, are increasingly utilized for storage/retrieval of audio/video (A/V) information. A requirement for such disk drives is to deliver information to host applications, such as data streaming applications, in a timely fashion according to a strict data delivery schedule. The unique requirements of such applications, relative to typical disk drive applications in personal computer environments, for example, are that data streaming applications require not only data integrity, but also substantially fixed storage and retrieval data transfer rates that are not flexible. For example, personal video recorders or digital video recorders, are generally required to deliver and store digital A/V data originating from a broadcast source to a disk drive, and to retrieve stored data via memory buffers and play back through loudspeakers or video screens. All such activities are controlled by a controller such as a software configured microprocessor.

Disk drives, by nature, deliver data to a host asynchronously. This is due to varying data transfer rates across disk diameters, the requirement to interrupt data streams in order to change location (seek), and the possibility of error correction delays. As such, buffering of the data is required either in the disk drive or by the host application. Because buffering data requires random access memory (RAM), the memory cost associated with larger buffers is an important consideration, and reducing memory costs is desirable for both manufacturers and consumers.

The amount of buffer memory required depends on the disk drive throughput capability and host application data streaming requirements. To determine disk drive throughput capability for various host data streaming requirements, the disk drive must be tested for all possible host application streaming data transfer rates, which are dynamic and varied. Determining the amount of buffer memory required, by measuring disk drive performance for a worst case streaming data transfer rate requirement, does not ensure that the amount of buffer memory will be sufficient for other data transfer rate requirements. As such, conventionally a disk drive must be re-tested at each required data transfer rate to ensure that for a given buffer size the disk drive can meet data transfer rate requirements of the host system in any condition at any data transfer rate. This is very time consuming and expensive, substantially decreasing productivity, and increasing disk drive costs for the manufacturers and consumers.

There is, therefore, a need for method and apparatus to measure performance capability of storage media in various application environments, to reduce performance measurement complexity and cost, and to determine buffer memory required for satisfactory performance in different application environments such as in A/V streaming applications.

BRIEF SUMMARY OF THE INVENTION

The present invention satisfies these needs. In one embodiment, the present invention provides a method for measuring performance of a storage device including rotatable media, for storing data to and/or retrieving data from said media. The measurement method includes the steps of: specifying one or more access patterns for transferring data to/from the media; and for each access pattern, specifying one or more different required data transfer rates, measuring the actual data transfer time of the storage device for transferring said data according to that access pattern, and determining performance of the storage device in relation to each required data transfer rate based on the actual data transfer time for said data.

In one example, each access pattern includes one or more data transfer commands, wherein each command is for transferring one or more data blocks from/to the storage device. An adjustable virtual buffer size value is maintained for each data transfer rate. For each data transfer command per access pattern, the actual data transfer time of the storage device to transfer data blocks for that command is measured; and for each data transfer rate: the amount of data transfer required according to that required data transfer rate during the data transfer time of that transfer command is measured; the difference between the required amount of data transfer and the actual amount of data transferred according to transfer command is measured; and the virtual buffer size value for that data transfer rate is adjusted based on said difference. Wherein, a buffer selected based on one or more of the adjusted virtual buffer size values for each data transfer rate per access pattern, allows streaming data to/from the storage device via the buffer at least at that required data transfer rate for that access pattern.

In another embodiment the present invention provides software an apparatus for implementing the steps of the methods of the present invention.

BRIEF DESCRIPTION OF THE DRAWINGS

These and other features, aspects and advantages of the present invention will become understood with reference to the following description, appended claims and accompanying figures where:

FIGS. 5A and 5B show example flow diagrams of other embodiments of the steps of measuring disk drive performance according to the present invention;

FIGS. 6A and 6B, together, show a functional diagram of another example embodiment of the steps of measuring disk drive performance according to steps FIGS. 5A and 5B;

FIG. 7 shows function flow diagram of example scenario of another embodiment of the steps of measuring disk drive performance according to the present invention;

FIGS. 8A and 8B, together, show example parameter specifications for different example access patterns for measuring/testing performance of a disk drive;

FIG. 9 provides an example excerpt from an example test report for a disk drive; and FIG. 10 shows an example architectural block diagram of an embodiment of the test system of FIG. 2 in which the methods of the present invention can be implemented.

To facilitate understanding, identical reference numerals have been used, where possible, to designate structurally/functionally identical or similar elements that are common throughout the figures.

DETAILED DESCRIPTION OF THE INVENTION

Figure 1:
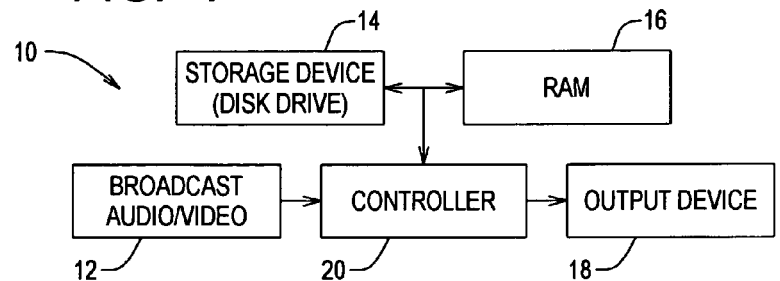
FIG. 1 shows an example architectural block diagram of an embodiment of an A/V system including a storage device such as a disk drive.

FIG. 1 shows an example architectural block diagram of an embodiment of an A/V system 10 including a storage device 14 such as a disk drive. The A/V system 10 utilizes the hard-disk drive 14 to deliver information to a host application in a timely fashion according to a strict data streaming schedule (e.g., data transfer rate). Such a host application is referred to herein as 'data streaming' application. The unique requirements of such host applications relative to typical hard drive applications (e.g., in personal computer environments) are that data streaming in such host applications emphasize not only data integrity, but also storage and retrieval data transfer rates that are not flexible.

The example A/V system 10 includes a broadcast source 12 for originating analog or digital audio/video data, a storage device 14 such as a disk drive for storing the data, a memory (e.g., RAM) 16 for buffering data, an output device 18 such as a display device (e.g., TV, monitor, HDTV, LED, etc.), and a controller 20 including e.g. microprocessor and software, for controlling said components of the A/V system 10. Data streaming applications can be utilized in the A/V system 10 (e.g., personal video recorder, digital video recorders, etc.) for generally delivering and storing digital audio and video data originating from the broadcast source 12 to the storage device 14, and for playing back data/programs buffered in the RAM 16 through e.g. loudspeakers or video screens 18, controlled by the host controller 20. The host application can comprise e.g. a personal video recorder application with RAM memory 16 denoted as buffer, MPEG-compressed analog or digital video and audio denoted as the broadcast content, a television/home stereo as the display devices, Etc.

A disk drive 14 is one of several storage devices utilized in A/V systems. Because a disk drive, by nature, delivers data asynchronously to a host (e.g., due to varying data transfer rates across disk diameters, the requirement to interrupt data streams in order to change location (seek), the possibility of error correction delays, etc.), buffering of the disk data is required either in the disk drive 14 or in the host application. The amount of buffer memory required depends on the disk drive throughput capability and host application data streaming requirements. In one aspect the present invention provides a method and test system for measuring performance capability of a storage device (e.g., disk drive) in various application environments, to reduce complexity and cost in conventional disk drive performance measurement methods, and to determine buffer memory required for satisfactory disk drive performance in different application environments such as in A/V streaming applications.

Figure 2:
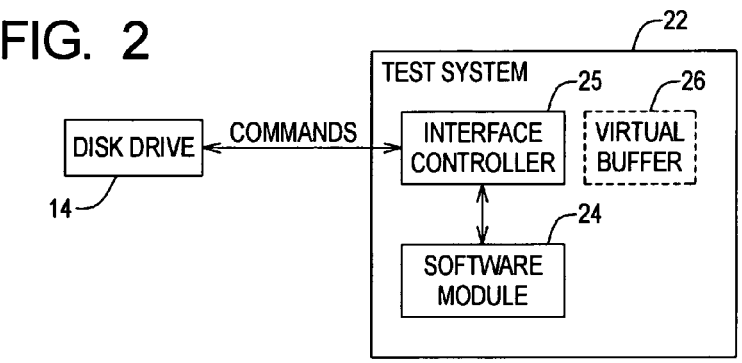
FIG. 2 shows an example architectural block diagram of interconnection of an embodiment of a test system/apparatus according to the present invention for measuring the performance of the disk drive of FIG. 1.

FIG. 2 shows an example architectural block diagram of interconnection of an embodiment of a test system 22 according to the present invention for measuring the performance of the disk drive 14 of FIG. 1. The test system 22 is substituted for the host application implemented in the A/V system 10 of FIG. 1, to test the capability of the disk drive 14 to stream data to such host application. The test system 22 allows measuring the disk drive performance by demanding storage or retrieval of data which system 22 and the disk drive 14 can support. The test system 22 simulates host application attributes including varying host application data transfer rate requirements from application to application, varying number of data streams, varying location of data on the disk drive, and stream fragmentation. In one version, the test system 22 is used to gather read/write command execution times during A/V bi-directional data streaming to/from the disk drive. The command execution times are processed to determine the capability of disk drive's data streaming operations to satisfy various performance requirements.

In one version, the test system 22 implements a test method for measuring disk drive performance in servicing multiple data streams at multiple data transfer rates without requiring actual host applications (e.g., digital video recorder) to be attached to and accessing the hard drive 14 via a disk drive interface controller 25. In one version such a test method is implemented within the test system 22 as a software module 24 using virtual buffers 26 (e.g., test setup for virtual buffer management).

Figure 3:
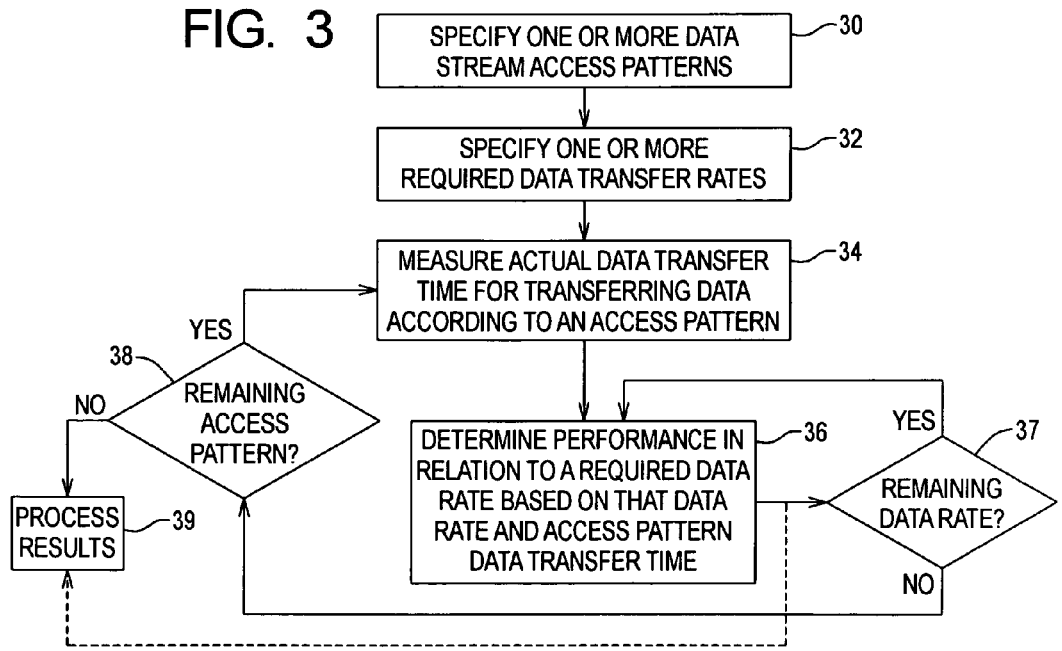
FIG. 3 shows an example flow diagram of an embodiment of the steps of measuring disk drive performance according to the present invention

FIG. 3 shows an example flow diagram of an embodiment of the steps of such a test method for measuring disk drive performance according to the present invention, via one or more virtual data buffers 26 in the test system 22. Generally, the test method includes the steps of: specifying one or more data access patterns for transferring data to/from the disk drive 14 (step 30); specifying one or more different required data transfer rates (step 32); for at least one access pattern, measuring the actual data transfer time of the disk drive 14 device for transferring said data according to that access pattern (step 34); and determining performance of the disk drive 14 in relation to at least one required data transfer rate as a function of that data transfer rate and the actual data transfer time for at least one access pattern (step 36).

In one version, if another data transfer rate remains (step 37), step 36 is repeated for that data transfer rate, and so on until disk drive performance is determined in relation to each data transfer rate for an access pattern. Thereafter, if another access pattern remains for testing the disk drive 14 (step 38), steps 34, 36 and 37 are repeated for that access pattern, and so on until the performance of the disk drive 14 has been determined (measured/tested) for each required data transfer rate, and for all the access patterns. The performance test results are processed for determining e.g. required buffer size for the disk drive 14 to properly stream data according to said data transfer rates and access patterns (step 39).

Figure 4:
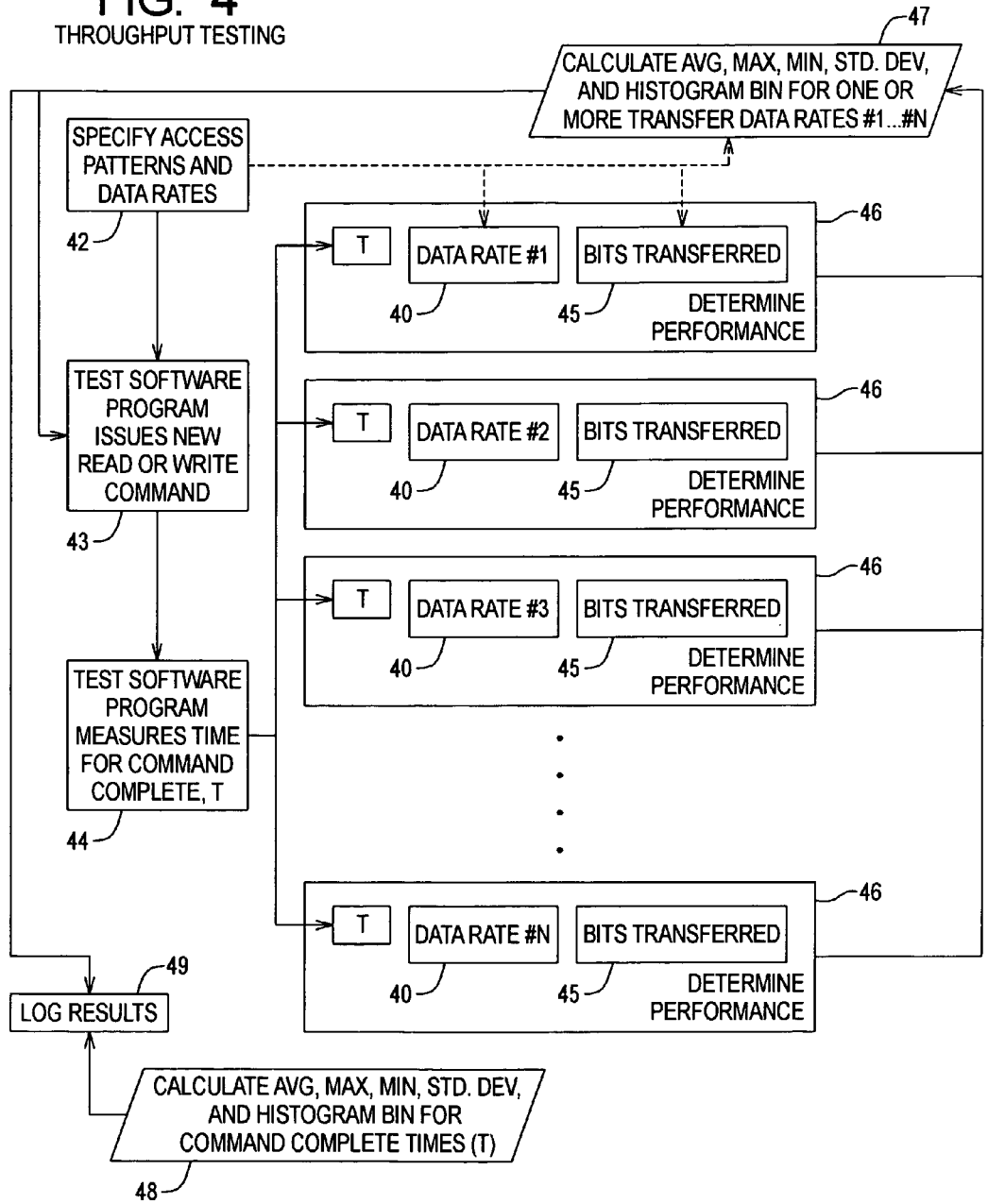
FIG. 4 shows a functional diagram of another example embodiment of the steps of measuring disk drive performance according to steps in FIG. 3.

FIG. 4 shows a flow/functional diagram of another example embodiment of steps of measuring disk drive performance according to the present invention, that can be implemented as a test module 24 (e.g., test software program) in the system 22 (FIG. 2), for example. One or more data transfer rates 40 and data access patterns are specified e.g. by a user for the disk drive read/write operations (step 42) in the module 24. Each access pattern includes a set of data transfer operations (commands) for one or more data streams at one or more locations on concentric data tracks on at least one disk in the disk drive 14.

The test system 22, under control of the module 24 (e.g., Test Software), selects one of the access patterns and issues a transfer operation such as a read/write command specified in the selected access pattern to the disk drive 14 (step 43). The module 24 then measures the time T for the disk drive to perform the command e.g. by transferring data specified by the command (e.g., at least one access unit) from/to the disk drive (step 44). The time T is the actual measured time for performing said data transfer operation. The module 24 determines performance of the disk drive 14 for each data transfer rate 40 (e.g., Data Rate #1 . . . #N) as a function of: that data transfer rate 40, the data transfer (command completion) time T, and number of bits transferred according to the command (step 46).

In one version step 46 includes the steps of determining the amount of data transfer required for one or more data transfer rates 40 (e.g., Data Rate #1 . . . #N) during the measured time T for command of the access pattern. The amount of data transfer required for each data transfer rate 40 is a product of the measured time T and the data transfer rate 40 (e.g., T×Data Rate #N). Then the number of bits actually transferred 45, as specified in the read/write command, is subtracted from said required data transfer bits (e.g., T×Data Rate #N), for each data transfer rate 40 (e.g., Data Rate #1 . . . #N). The subtraction result for each data transfer rate 40 provides a difference between said required data transfer bits during the measured time T, and the actual number of bits transferred to/from the disk drive 14 during that time T, for that data transfer rate 40. The values T are processed to determine e.g. average, maximum, minimum, standard deviation, histograms for the values T per command per access pattern (step 48). Further, the performance results are processed to determine average, maximum, minimum, standard deviation, histograms for the performance results per data transfer rate 40, per access pattern (step 47). The processing results can logged for later analysis (step 49). Steps 44, 43, 46, 47, 48, 49 are repeated per command, per access pattern.

In one version, performance determination according to the present invention can be utilized to determine a required size value for a buffer per data transfer rate whereby the disk drive 14 can properly stream data according to each data transfer rate via the corresponding buffer. The example access pattern data transfer operations described herein apply to both read and write commands. The difference between a read command and a write command operation in this context is in the actual handling of data buffered in a host application buffer. In case of a write operation to the disk drive in a host application, the host buffer starts the streaming operation in an empty state, reserving the required amount of buffer in the host to 'queue' or 'cache' the write command data until the disk drive completes the operations required. In the case of a read operation from the disk drive in a host application, the host buffer starts the streaming operation by filling up the host buffer to a specified level prior to streaming data out to e.g. a display device. In one version, the buffer requirements described herein refer to the amount of RAM the host must reserve when writing to the drive, and to the amount of RAM filled with data read from the drive before beginning to display the data stream when reading from the disk drive.

Figure 5A:
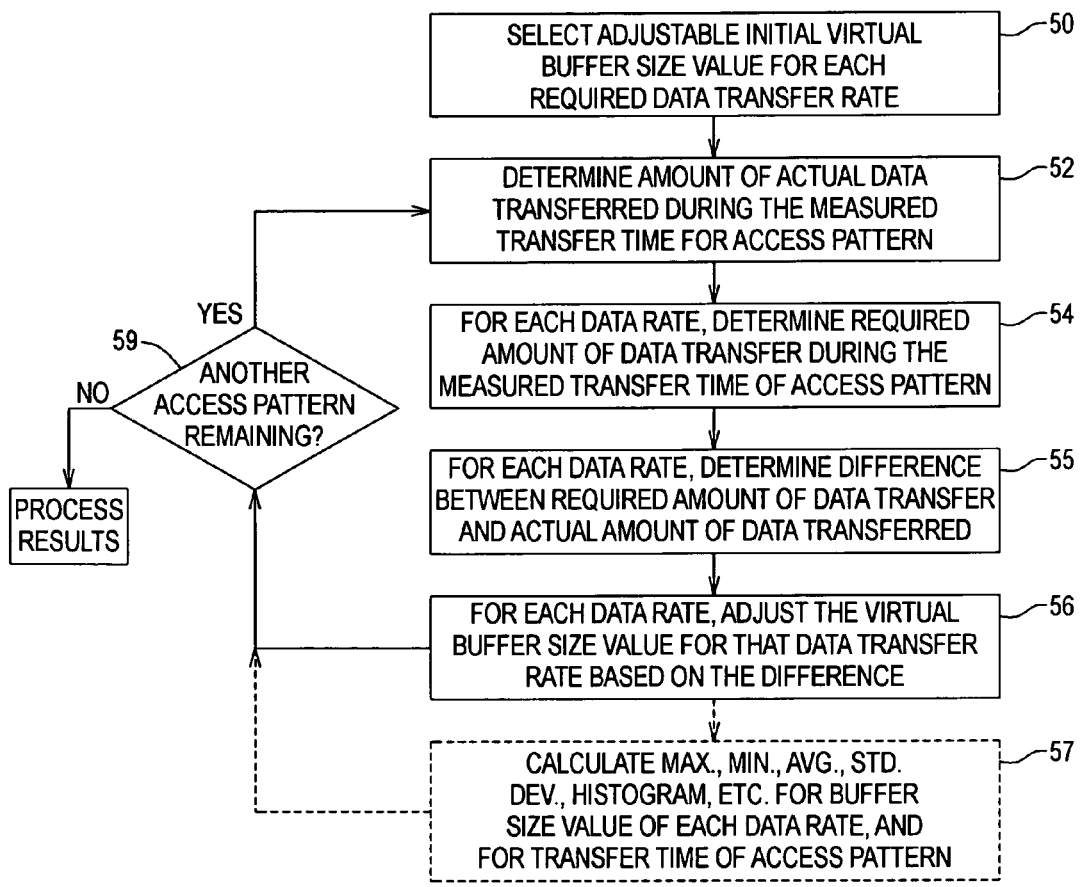

FIG. 5A shows an example flow diagram of an embodiment of determining performance of the disk drive 14 (e.g., step 36 in FIG. 3, or step 46 in FIG. 4) in relation to each required data transfer rate per access pattern based on measured actual data transfer time for that access pattern using a virtual buffer model. An adjustable virtual buffer size value is selected for each data transfer rate per access pattern (step 50), and amount of actual data transferred during the measured actual data transfer time for that access pattern is calculated (step 52) (e.g., the amount of actual data transferred can be the amount of data transfer specified in the access pattern).

For each required data transfer rate: the amount of data transfer required during the measured actual time according to that data transfer rate is determined (step 54), the difference between the required amount of data transfer and the actual amount of data transferred is determined (step 55) and the virtual buffer size value for that data transfer rate is adjusted based on said difference (step 56). Optionally, the measured data transfer times and adjusted buffer size values can be used to calculate maxima, minima, standard deviation, average, histogram, etc. for the buffer size values for each data transfer rate, and for the data transfer times for each access pattern (step 57). As described further below, the calculation results can later be used in a processing step to determine e.g. a host buffer size value for each host data transfer rate for data streaming to/from the disk drive according to each host data transfer rate. If another access pattern remains (step 59), steps 52–57 are repeated for that access pattern, until disk drive performance for all data transfer rates and access patterns has been determined.

FIG. 5B shows an example flow diagram of another embodiment of determining performance of the disk drive 14 (e.g., step 36 in FIG. 3, or step 46 in FIG. 4) in relation to each required data transfer rate per access pattern based on measured actual data transfer time for that access pattern using a virtual buffer model. Each access pattern includes one or more data transfer operations (commands) for accessing one or more locations on a disk in the disk drive 14 to read/write data. An access pattern is selected (step 60), and an adjustable initial virtual buffer size value is selected for each required transfer rate (step 62). For a selected access pattern, for each data transfer operation in the access pattern: the actual data transfer time of the disk drive 14 for that data transfer operation is measured (step 64); the amount of actual data transferred during the measured actual data transfer time for that data transfer operation is then determined (step 66). In one example, determining the amount of actual data transferred during the measured actual data transfer time in step 66 comprises using the amount of data transfer specified in the data transfer operation as said amount of actual data transferred during said measured actual data transfer time.

For each required data transfer rate: the amount of data transfer required during the measured actual data transfer time, according to that required data transfer rate is determined (step 68); the difference between the required amount of data transfer and the actual amount of data transferred is determined (step 70); and the virtual buffer size value for corresponding required data transfer for the transfer operation is adjusted based on the difference (step 72). Optionally, the measured data transfer time and adjusted buffer size value can be used to calculate maxima, minima, standard deviation, average, histogram, etc. for the buffer size value of that data transfer rate, and for the data transfer times for the access pattern (step 73). The calculation results can later be used in a processing step to determine e.g. a host buffer size value for each host data transfer rate for data streaming to/from the disk drive according to each host data transfer rate.

After step 72 (or step 73), it is determined if another required data transfer rate remains for the selected access pattern (step 74). If so, steps 68–72 are repeated, until all data transfer rates for a data transfer operation have been utilized to adjust the corresponding virtual buffer size values. When all data transfer rates for a data transfer operation have been utilized in steps 68–72, it is determined if another transfer operation remains in the selected access pattern (step 76). If so, steps 64–76 are repeated until all data transfer operations for the selected access pattern are completed. Thereafter, it is determined if another access pattern remains (step 78), and if so, steps 60–78 are repeated for the next access pattern, until all access patterns have been completed. Thereafter, performance results, such as obtained in step 73, are processed (step 79) for determining e.g. host buffer size per data transfer rate for streaming data to/from the storage device at least at the data transfer rate for the access patterns.

Figure 6A:
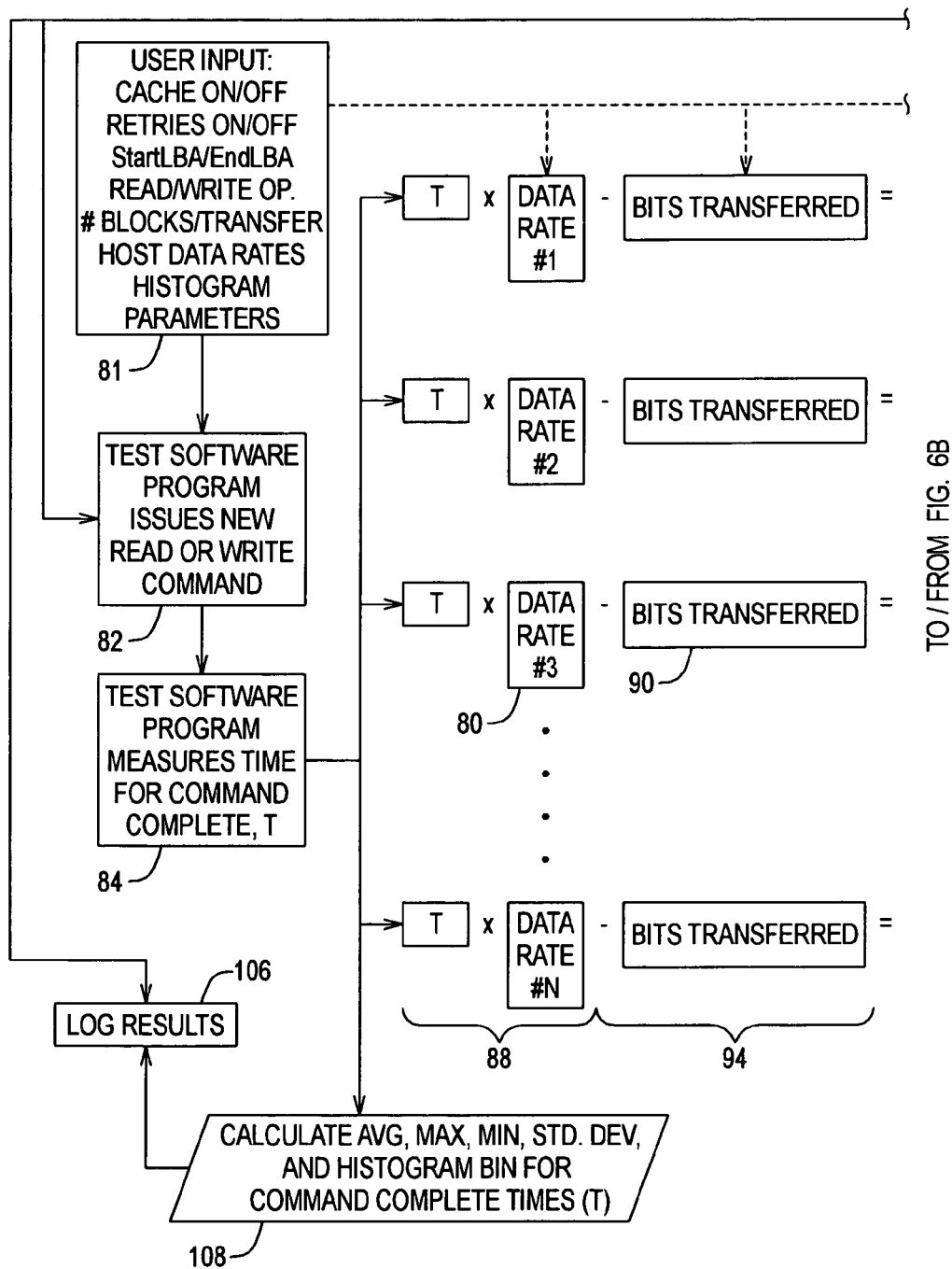

FIGS. 6A and 6B, together, show a functional/flow diagram of steps in FIGS. 5A–5B, of measuring disk drive performance according to an embodiment of the present invention, that can be implemented as a test module 24 (e.g., test software program) in the system 22 (FIG. 2). One or more data access patterns and one or more host data transfer rates 80 (e.g., Data Rate #1 . . . #N) are specified e.g. by a user for the disk drive read/write operations (step 81) in the module 24. Each access pattern includes a set of data transfer operations for one or more data streams at one or more locations on concentric data tracks on at least one disk in the disk drive 14.

Each data access pattern can be specified by parameters including e.g.: (1) the number of data streams in the access pattern, such as single-stream, dual-stream, or multiple-stream; (2) location of data on the disk e.g. starting logical block address (LBA) and ending LBA, referring to the logical block addresses where each data stream starts and ends; (3) type of data transfer operation (command) such as read or write; (4) access unit size for each data stream, wherein access unit size defines the number of data blocks (sectors) in concentric tracks on the disk to be accessed sequentially from each stream. Access unit size affects the basic efficiency of data transfer because of associated transducer location change (seek) and latency (time spent waiting for the specified block to reach the recording head) between each data access unit, wherein all hard disk activity occurring between the access units is considered 'overhead', and thus time wasted; (5) disk drive configuration parameters that can be specified by the user, affecting data transfer, including e.g. write/read cache enabled/disabled, number of retries allowed for an error condition, transfer mode (ATA-33, ATA-66, etc), seek mode, etc.; (6) host data transfer rates including one or more data transfer rate requirements for each of the data streams to be transferred from the disk drive, wherein multiple required data transfer rates can be specified for each data stream; and (7) data collection parameters including maxima, minima, standard deviations, and histogram parameters that can be used to describe the results of the performance measurement and testing.

The test system 22, under control of the module 24, selects one of the access patterns and issues a transfer operation such as a read/write command specified in the selected access pattern to the disk drive 14 (step 82). The module 24 then measures the time T for the disk drive to perform the command e.g. by transferring data specified by the command (e.g., at least one access unit) to/from the disk drive (step 84). The accuracy of this measurement is important, and preferably any measurement error is at least an order of magnitude lower than the measured time T itself. The time T is the actual measured time for performing said data transfer operation.

The module 24 then determines the amount of data transfer required for each data transfer rate 80 (e.g., Data Rate #1 . . . #N) during the measured time T for the access pattern. The amount of data transfer required for each data transfer rate 80 is a product of the measured time T and the data transfer rate 80 (e.g., T×Data Rate #N) (step 88). Then the number of bits actually transferred 90, as specified in the read/write command (e.g., bits per access unit or number of blocks×512 bytes per block×8 bits per byte), is subtracted from said required data transfer bits (e.g., T×Data Rate #N), for each data transfer rate 80 (e.g., Data Rate #1 . . . #N) (step 94). The subtraction result for each data transfer rate 80 provides a difference 92 between said required data transfer bits (e.g., required number of bits by an A/V application) during the measured time T, and the actual number of bits transferred 90 to/from the disk drive 14 during that time T, for that data transfer rate 80.

Each said difference 92 is utilized as an adjustment (e.g., increment or decrement) to the current virtual buffer size value 96 to obtain an adjusted virtual buffer size value 98 for a corresponding data transfer rate 80 (step 100). The current virtual buffer value size 96, is the cumulative buffer size value from a last transfer operation (e.g., after an initial transfer operation). This buffer size value 96 is updated after each data transfer operation to obtain the adjusted virtual buffer size value 98, and the adjusted value 98 is used as the current value 96 (e.g., the adjusted value 98 overwrites the current value 96) for the next transfer operation. The adjusted value 98 can be greater than, less than, or equal to the current value 96. Further, the adjusted value 98 can be negative (i.e., less than zero). If the adjusted value 98 is negative, the adjusted value is set to zero (step 102). Steps 82, 84, 88, 94, 100, 102 are repeated for each data transfer operation, for one or more access patterns specified. Further, steps 88, 94, 100 and 102 for each data transfer rate 80 can be performed sequentially, or at the same time, based on the processing capabilities of the test system 22.

In one version, after each transfer operation (command), the module 24 performs data analysis including tracking and calculating/updating specified parameters such as the maxima, minima, standard deviation, average, and histogram values of e.g. adjusted buffer size value for each required data transfer rate 80 (step 104), and log the parameter results in a log file (step 106). Further, after measuring each command completion time, the module 24 can further calculate/update specified parameters such as maxima, minima, standard deviation, average, and histogram values of the measured time value T for that command (step 108) and log the parameter results. The parameter results can later be used in a processing step to determine e.g. a host buffer size value for each host data transfer rate for data streaming to/from the disk drive according to each host data transfer rate.

Referring to FIG. 7 in conjunction with FIGS. 6A and 6B, in an example operation scenario, a set of host data transfer rates 80, and a set of values defining one or more access patterns are provided to the test software module 24, implemented in the test system 22, as user script inputs (step 110). As detailed above, the access pattern values specify e.g. where and how much data is accessed in the disk drive 14 according to each access pattern test. For example, there can be three basic types of access patterns: sequential access, dual stream access and multiple random access. An unlimited number of access patterns can be contemplated and tested, however said three basic access patterns can adequately cover the majority of data streaming applications.

A sequential access pattern describes data streaming from a single contiguous location on a disk in the disk drive 14. Such an access pattern is utilized e.g. where the disk drive 14 is used in an A/V application for recording or playing a single audio/video multiplexed stream. For a sequential access pattern test, to account for all possible sequential access patterns, data transfer is performed once from each possible drive data location, such as data block address, that requires performance evaluation. In one example, block address refers to the physical location of data on the disk in the disk drive 14. A disk drive 14 typically presents a fixed number of block addresses to a host application (e.g., 30 million blocks). The block addresses are then translated to physical locations on the disks (e.g., cylinder 2000, head 2, block 250). In one example version of the disk drive 14, block addresses close to zero (e.g., less then 3 million blocks) map to the outer 10% (3/30) of the disk stack outer diameter (the O.D.), and block addresses close to a maximum reside at the disk stack inner diameter (I.D.). In that example, many disk data locations are possible because all are selected by the host application. However, generally test streams can be applied in each of the two extremes (O.D. and I.D.) where historically most data access errors may occur.

A dual stream (2-stream) access pattern describes data streaming from two different locations in the disk drive 14 (e.g., two different disks or two different locations on one disk). Such an access pattern is utilized e.g. where the disk drive 14 is used in an A/V application for recording or playing two different audio/video multiplexed streams simultaneously. The dual stream access pattern is different from the sequential access pattern because in the former the data is contiguous inside each of the dual data streams and the two data streams are interleaved in time and location, requiring the disk drive heads/transducers to re-position more often.

A multiple random stream access pattern describes data streaming from varying locations in the disk drive 14. A host application that requires data from three or more streams simultaneously can be modeled as a multiple random stream access pattern. This is because a 'worst case' multi-stream condition includes one stream at each extreme diameter location on disks in the disk drive 14, and a third stream in between. As such, the average access distance is ⅔ stroke per seek. A random access pattern typically requires a ⅓ stroke per seek average, however as more data streams are included, the ⅓ stroke average is approached. For example, the multiple random stream access pattern can include reading a single fragmented data stream, as can be encountered in video editing, or reading several data streams from various locations in the disk drive 14, and multiplexing the multiple data streams for later sorting.

With reference to FIG. 7, once each access pattern comprising sets of data transfer operations such as read/write commands, has been specified in step 110, the read/write commands are programmed into the test system 22 (test software/module 24) and sent sequentially to the disk drive 14 per access pattern (step 112). For each read/write command, the test software module 24 sends each command to the disk drive 14 after starting a command timer. A timer in the test software module 24 (e.g., digital timer available to the test software module 24 via the test system 22 processor) can be used to measure accurately the time T required to execute and complete each read/write command. The data is transferred to/from the disk drive 14 (step 114), and the test software module 24 stops the command timer to measure the elapsed data transfer interval (Command Time T) (step 116). The timer is selected based on accuracy and resolution of time measurements required.

The test software module 24 updates statistical parameters (e.g., max., min., std. dev., avg., histogram, etc.) variables for the time T, (step 118). The test software module 24 uses single command time measurements T to adjust each virtual buffer model size value corresponding to each required data transfer rates as described above (step 120), and updates statistical parameters (e.g., max., min., std. dev., avg., histogram, etc.) for each buffer size value corresponding to each data transfer rate (step 122). The test software module 24 then determines if an additional command remains in the current access pattern (step 124). If so, the test software module 24 repeats steps 112 through 124, otherwise, the test is complete.

The time interval T is used in a virtual buffer size determination method/model, described above e.g. in relation to FIGS. 6A, 6B and 7, and reflects the time from command issued to command complete. Each time the test software module 24 measures the time T for a read/write command, that time T is then used to calculate virtual buffer size requirements for desirable data streaming. Referring back to FIGS. 6A and 6B, the module 24 performs a complete loop (e.g., steps 88, 94, 102, 104, 106, 108 in FIGS. 6A and 6B) for each command execution time T before issuing the next read/write command, measuring the command completion time, and determining adjusted virtual buffer size for each data transfer rate. In one example operation, the time T for performing a read/write command is measured and then multiplied by the multiple user/required data transfer rates 80. Each multiplication result is the number of bits demanded by the corresponding data transfer rate 80 in the amount of time, T. The actual number of bits transferred 90, as specified by the read/write command, to/from the disk drive is then subtracted from each said multiplication result to determine a difference as the virtual buffer size value increment/decrement 92 for each data transfer rate 80. For a first data transfer in an access pattern, the value 92 is the initial virtual buffer size value 96.

In one example, for a read/write command which the disk drive completes in the time T, said multiplication result refers to the number of bits which a host application streams at the required data transfer rate 80 in the time T. For example, if the disk drive 14 takes T=0.01 seconds to complete a 4,000 bit data transfer specified in a read command, and a host application demands/requires a streaming data transfer rate 80 of 1,000,000 bits/second (1 mbps), then the streaming bits demanded (1,000,000×0.01 or 10,000 bits) minus the actual bits transferred 90 (4,000 bits) results in 6,000 bits (increment/decrement value 92) which were not delivered to the host application in the time required, T. To satisfy the host application transfer rate requirement of 10,000 bits transferred in T=0.01 seconds, said 6,000 bits must be cached in a host buffer for that host application. As such, the current buffer size value 96 is incremented by the value 92 of 6,000. The same time measurement T (0.01s) can be applied to many data transfer rates 80 simultaneously, thus adding or subtracting to/from many virtual buffer size values, to determine different buffer sizes required for use with the disk drive 14 to satisfy different data transfer rate requirements of different host applications (e.g., A/V applications/systems).

In case of a write operation to the disk drive 16 utilized in a host application, the host buffer starts the streaming operation in an empty state, reserving the required amount of buffer in the host to 'queue' or 'cache' the write command data until the disk drive 16 completes the operations required. In the case of a read operation from the disk drive in a host application, the host buffer starts the streaming operation by filling up the host buffer to a specified level prior to streaming data out to e.g. a display device. The buffer requirements described herein refer to the amount of memory a host application must reserve when writing to the drive to stream data at a desired rate, and to the amount of memory the host application must reserve to be filled with data read from the disk drive before beginning to display the data stream when reading from the disk drive.

Referring back to FIGS. 6A and 6B, as subsequent read/write commands are executed, then the virtual buffer size value 96 is continually updated for each data transfer rate 80. Any virtual buffer size values that are negative in value are then reset to zero as negative buffer size values are meaningless and simply signify that the disk drive is performing adequately for that data transfer rate 80. Thereafter, data logging steps are performed as each time command completion time T and updated virtual buffer size value per data transfer rate is determined. For example, maxima, minima, standard deviation, or histogram bins are calculated and logged for posting in a results file. Further, statistics regarding the raw time measurements, T, can also be calculated and logged as they are measured.

FIGS. 8A and 8B, together, show example parameter specifications in Table 1 for different example access patterns for measuring/testing performance of a disk drive 14. Table 1 provides three specific access patterns for each of each of the three Sequential, Dual-Stream, and Random test streams. Relevant stream parameters are specified, including for example: (1) Access pattern or test stream type (e.g., sequential access, dual stream access and multiple random access); (2) test time, specifying the amount of time that a particular access pattern test runs and is based on the specific drive being tested; (3) transfer operation (e.g., write (Wrt.) or read (Rd.)); (4) silent seek, specifying a parameter which can be set on some disk drives to control seek noise; (5) cache setting, specifying whether or not the disk drive will attempt to string together contiguous transfer commands greater than the single command size allowance (e.g., 256 sectors for AT type disk drive) into one large transfer, thus maximizing the bandwidth of the disk drive (e.g., accomplished in AT type disk drive by a relatively small amount of RAM onboard the disk drive); (6) number of blocks per transfer operation/command (nb); (7) total transfers, specifying the total number of commands in each access pattern test, wherein for an access pattern, total transfers multiplied by the sectors per transfer (blocks per transfer) multiplied by the number of bits per sector (e.g., 4096) provides the total bits transferred according to that access pattern; (8) Stream 1 start, specifying the location in the disk drive of the first sector to be transferred for that access pattern; (9) Stream 2 start, applies only to the dual stream mode and specifies the location of the first sector relative to the $2^{nd}$ stream location in the disk drive to be transferred for that access pattern; and (10) hosts data test rates (TR) (e.g., megabits per second (Mbps)) to test against.

In Table 1, maximum logical block address (maxlba) specifies the maximum sector number accessible on the disk drive. Further, "ID Sequential" specifies a sequential test (access pattern) at the Inner Diameter of the drive disk stack. and "OD Sequential" specifies a sequential test at the Outer Diameter of the drive disk stack; "2-stream FS" specifies Dual Stream test (access pattern) across the Full Stroke(FS) of the drive; "2 stream O.D. ⅓" specifies a Dual Stream test across the Outer Third Stroke of the drive; "2 stream I.D. ⅓" specifies a Dual Stream test across the Inner Third Stroke of the drive; and "Random FS" specifies a Random Access test across the Full Stroke (FS) of the drive. For example, test scripts (e.g., text files written in a scripting language to control the operation of the executable program) generated from Table 1 and executed by the test system 22, generate disk drive performance results for each data transfer rate in each test, indicating statistical results of buffer size and transfer time.

In one aspect of the present invention, for each data transfer rate required by each host application, a determination is made of the size of a host buffer required for the disk drive 14 to satisfy the data transfer rate requirement of the host application. In the test method described herein, the virtual buffer size value is adjusted after each read/write command completion because buffer requirements are cumulative, thus allowing a disk drive to 'catch up' to a host required streaming rate should an event (e.g., read/write error) temporarily halt data streaming to/from the disk drive. During each access pattern test, the virtual buffer size value for each data transfer rate fluctuates, occasionally increasing (e.g., when the disk drive encounters data transfer errors) and decreasing (e.g., when the disk drive operates error free). Said fluctuations are logged statistically (e.g., Max., Min., Avg., Std. Dev., Histogram, Etc).

For each access pattern test, the virtual buffer size value is adjusted after each read/write command completion in that access pattern. Cumulative results from all the read/write command completion times are reported for each access pattern only after all the read/write commands specified for that access pattern are executed. The cumulative results include values in registers or memory locations in the test system 22 where module 24 tracks the current test results. Some of the values change after each read/write command execution (e.g., average, histogram bin values, standard deviation, etc.), while other values change after certain thresholds (e.g., maximum, minimum) are reached.

The statistical results (e.g., maxima, minima, avg., std. dev., histogram, etc.) for command completion times T per access pattern, and for adjusted buffer size values per data transfer rate are utilized in various system design decisions. The test results can be used to e.g. choose host buffer size, choose data storage pattern, Etc. For example, when one or more access pattern tests for a data transfer rate are complete, the maximum adjusted buffer size value for that rate can be used as a recommendations for a host buffer size for streaming data to/from the disk drive at that data transfer rate. The average value for the adjusted buffer size of a data transfer rate can be used to determine if the average buffer size value is much lower than the maximum buffer size value, indicating the maximum value was transient. If the average is close to the maximum value, then the maximum value is not a transient. The command completion time data provides information regarding the efficiency (e.g. throughout) of the disk drive transfer operation. Further the command completion times provide duty cycle information for the disk drive.

Said statistical results can further be used to design the host operating system to store sequential streams in a location on the disk to use smaller buffer. Said results can be used to make recommendations on how to store and how to access data on a disk drive to e.g. minimize the host buffer required for different data transfer rates and access patterns (e.g., storing operating system data that is accessed randomly at the I.D. of the disk in the disk drive, while storing data streams at the O.D. of the disk).

FIG. 9 shows Throughput Summary Table 2 which provides an excerpt from an example performance test report for a specific disk drive 14 (e.g., Quantum Lct10), showing throughput results for the disk drive based on different access pattern tests. The data in Table 2 can be used to determine host buffer sizes for different host data transfer rates. For example, for host data transfer rates at or below those listed for the access unit sizes in Table 2, a 1 MB per stream host buffer size is sufficient for streaming (shown as Throughput Criteria in FIG. 9, indicating host buffer sizes per stream).

Preferably a host buffer size is selected based on the data transfer rate requirement of the host system. For example, if performance measurement indicates a buffer size of 1.5 MB is required to the disk drive to support a 30 Mbps stream host data transfer rate, then the host system requires a 1.5 MB buffer to handle that stream rate. An exception is when the disk drive is a stream delivery medium with embedded file system and buffering control, rather than a 'bit-bucket' being accessed as a large RAM type device.

When testing a disk drive 14 for throughput capability in various conditions (e.g., various data transfer environments such as in A/V applications or systems), preferably the disk drive 14 is tested for all possible user application streaming environments, which are dynamic and varied. Though a worst case data transfer rate can be tested, such a test does not indicate how well the disk drive satisfies lower data transfer rate requirements. As such, the disk drive must be re-tested at each user/required data transfer rate to ensure that the disk drive can properly meet buffer requirements of the host application/system in any condition and at any data transfer rate. Such re-testing is expensive, and time consuming.

The present invention alleviates such problems, by basing disk drive performance measurements on time (e.g., command completion time T) rather than on the amount of actual data transferred. This is because a time measurement T for a read/write command is applied to one or more required data transfer rates 80, sequentially or simultaneously, without requiring re-test and completion time for that same read/write command. This greatly reduces the amount of time needed to station a disk drive in a test fixture, environmental chamber, or vibration table. Reduction in performance measurement/test time reduces the cost of testing proportionately to the time reduction. For example, measuring four required data transfer rates 80 instead of only one can reduce the test time by 75%. As such, the present invention can be used to qualify/test a disk drive for many different host applications with differing data transfer rate requirements, at one time, thus saving time and reducing expense.

In one example the test system 22 can comprise a general purpose computer having a processor, memory, storage, ROM, and disk drive interface controller (e.g., IDE, SCSI, Fiber, etc.), interconnected via a bus. The test system 22 runs an operating system (e.g., DOS, Windows, Linux, Etc.) and issues commands to the disk drive 14 via the interface controller. Access patterns is programmed into the test system 22 via the module 24 (e.g., software module) running on the operating system in the computer. FIG. 10 shows another example architectural block diagram of an embodiment of a test system 22 in which the steps of the methods of the present invention can be implemented.

The test system 22 comprises a computer system including a bus 202 or other communication mechanism for communicating information, and a processor 204 coupled with the bus 202 for processing information. The test system 22 also includes a main memory 206, such as a random access memory (RAM) or other dynamic storage device, coupled to the bus 202. A portion of the memory 206 is used for storing information and instructions to be executed by the processor 204, and another portion of the memory 206 is used for storing temporary variables or other intermediate information during execution or instructions to be executed by the processor 204. The test system 22 further includes a read only memory (ROM) 208 or other static storage device coupled to the bus 202 for storing static information and instructions for the processor 204.

A storage device 210, such as a magnetic disk or optical disk, is provided and coupled to the bus 202 for storing information and instructions. The bus 202 may contain, for example, thirty-two address lines for addressing the main memory 206 or video memory. The bus 202 can also include, for example, a 32-bit data bus for transferring data between and among the components, such as the CPU 204, the main memory 206 and the storage 210. Alternatively, multiplex data/address lines may be used instead of separate data and address lines.

In one embodiment, the CPU 204 comprises a microprocessor manufactured by Motorola(R) such as 680x0 processor, or a microprocessor manufactured by Intel(R), such as the 80x86, or Pentium(R) processor, or a SPARC(R) microprocessor from Sun Microsystems(R). However, any other suitable microprocessor or microcomputer may be utilized, based on the processing requirements for the test system 22. The main memory 206 can comprise dynamic random access memory (DRAM). And video memory (not shown) can comprise a dual-ported video random access memory.

The test system 22 can be coupled via the bus 202 to a display 212, such as a cathode ray tube (CRT), for displaying information to a computer user. An input device 214, including alphanumeric and other keys, is coupled to the bus 202 for communicating information and command selections to the processor 204. Another type or user input device comprises cursor control 216, such as a mousse, a trackball, or cursor direction keys for communicating direction information and command selections to the processor 204 and for controlling cursor movement on the display 212. This input device typically has two degrees of freedom in two axes, a first axis (e.g., x) and a second axis (e.g., y) that allows the device to specify positions in a plane.

According to one embodiment of the present invention, the steps of the methods of the present invention (e.g., described and shown in FIGS. 3–4) is implemented by the module 24 as logical operations in the test system 22. The logical operations can be implemented as one or more sequence of program steps/instructions in the main memory 206, and performed by the test system 22 in response to the processor 204 executing said instructions. Such instructions may be read into the main memory 206 from another computer-readable medium, such as the storage device 210 or floppy disks. Execution of the sequences of instructions contained in the main memory 206 causes the processor 204 to perform the process steps described herein.

One or more processors in a multi-processing arrangement may also be employed to execute the sequences of instructions contained in the main memory 206. In alternative embodiments, hare-wired circuitry may be used in place of or in combination with software instructions to implement the invention. Thus, embodiments of the invention are not limited to any specific combination of hardware circuitry and software. The implementation is a matter of choice and can depend on performance of the test system 22 implementing the invention. As such, the logical operations constituting said example versions of the invention are referred to for e.g. as operations, steps or modules. The program instructions can be provided to the test system 22 on a computer-readable medium, and configure the test system 22 to operate as described herein. Further the processes of the present invention can be implemented in a dedicated test system 22 comprising CPU, memory and interface with the disk drive 14.

In one embodiment, the test software module 24 can be stored as instructions on computer readable medium. The term "computer-readable medium" as used herein refers to any medium that participated in providing instructions to the processor 204 for execution. Such a medium may take may forms, including but not limited to, non-volatile media, volatile media, and transmission media. Non-volatile media includes, for example, optical or magnetic disks, such as the storage device 210. Volatile media includes dynamic memory, such as the main memory 206. Transmission media includes coaxial cables, copper wire and fiber optics, including the wires that comprise the bus 202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 204 for execution. For example, the instructions may initially be carried on a magnetic disk of a remote computer. The remote computer can load the instructions into its dynamic memory and send the instructions over a telephone line using a modem. A modem local to the test system 22 can receive the data on the telephone line and use an infrared transmitter to convert the data to an infrared signal. An infrared detector coupled to the bus 202 can receive the data carried in the infrared signal and place the data on the bus 202. The bus 202 carries the data to the main memory 206, from which the processor 204 retrieves and executes the instructions. The instructions received from the main memory 206 may optionally be stored on the storage device 210 either before or after execution by the processor 204.

The test system 22 also includes an interface 218 coupled to the bus 202. The interface 218 can comprise industry standard electrical connections, software protocols, and commands to communicate with and transfer data to and from the disk drive. Examples of the interface 218 include: (1) An AT interface using two 40-pin connectors and cable to communicate between two integrated AT controller blocks resident in a motherboard chipset on the test system 22 side and a disk drive controller on the disk drive 14 side, both running in the AT specified UltraDMA66 mode; and (2) A SCSI interface using two 50-pin connectors and cable to communicate between two controller blocks resident in a PCI SCSI adapter card in the test system 22 side and the disk drive controller on the disk drive 14 side.

The interface 218 provides a two-way data communication coupling to the disk drive 14 for measuring the performance of the disk drive 14. The disk drive 14 can comprise e.g. an AT/SCSI drive. The interface in the disk drive 14 is not restricted to a specific standard, and the present invention can be utilized with any interface that provides data transfer using commands which can be timed. Although versions of performance measurement method and apparatus according to the present invention have been described for a disk drive 14, the present invention can be equally applied to measure and analyze performance of other storage devices including rotating media (e.g., CD ROMS), to tape drives, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for measuring performance of a storage device for storing data to and/or retrieving data from the storage device, comprising the steps of:
   (a) specifying one or more access patterns for transferring data to/from the storage device;
   (b) specifying one or more different required data transfer rates; and
   (c) for each access pattern: measuring the actual data transfer time of the storage device for transferring said data according to that access pattern, and determining performance of the storage device in relation to at least one required data transfer rate as a function of: that required data transfer rate and the actual data transfer time of data for that access pattern.

2. The method of claim 1, wherein step (c) for each access pattern further includes the steps of:
   determining performance of the storage device in relation to each required data transfer rate for that access pattern as a function of that required data transfer rate and the actual data transfer time of data for said access pattern.

3. The method of claim 2, wherein step (c) for each access pattern further includes the steps of:
   determining the amount of data transfer required according to each data transfer rate during the actual data transfer time of that access pattern; and
   determining performance of the storage device in relation to each data transfer rate as a function of: (1) the actual data transfer time for that access pattern, and (2) each required data transfer rate and corresponding amount of data transfer required for that data transfer rate for that access pattern.

4. The method of claim 3, wherein step (c) for each access pattern further includes the steps of, for each data transfer rate: determining the difference between the required amount of data transfer for that data transfer rate and the actual amount of data transferred, during said actual data transfer time for that access pattern, and determining the performance of the storage device as a function of said difference.

5. The method of claim 1, wherein:
   step (a) further includes specifying each access pattern to include one or more data transfer commands, wherein each command is for transferring one or more data blocks from/to the storage device; and
   step (c) for each access pattern further includes the steps of, for each data transfer command for that access pattern: measuring the actual data transfer time for the storage device to transfer data blocks for that command, and determining performance of the storage device in relation to each data transfer rate as a function of that required data transfer rate and the actual data transfer time for that command.

6. The method of claim 5, wherein step (c) for each access pattern further includes the steps of:
   for each data transfer command for that access pattern: determining amount of data transfer required according to each data transfer rate during the actual data transfer time of that data transfer command, and determining performance of the storage device in relation to each data transfer rate as a function of the required amount of data transfer for that data transfer rate and actual amount of data transferred, during the transfer time for that transfer command.

7. The method of claim 6, wherein step (c) for each access pattern further includes the steps of, for each transfer command of that access pattern:
for each data transfer rate:
determining the difference between (1) the required amount of data transfer for that data transfer rate and (2) the actual amount of data transferred, during the data transfer time of that data transfer command; and
determining the performance of the storage device in relation to that data transfer rate as a function of said measured difference.

8. The method of claim 1, wherein:
step (b) further includes the steps of maintaining an adjustable virtual buffer size value corresponding to each required data transfer rate; and
step (c) for each access pattern further includes the steps of, for each required data transfer rate:
determining the amount of data transfer required according to that data transfer rate during the data transfer time of that access pattern;
determining the difference between the required amount of data transfer and the actual amount of data transferred according to that access pattern; and
adjusting the virtual buffer size value for that data transfer rate based on said difference.

9. The method of claim 8, wherein a buffer selected based on one or more of the adjusted virtual buffer size values for each data transfer rate per access pattern, allows streaming data to/from the storage device via the buffer at least at that required data transfer rate for that access pattern.

10. The method of claim 8, further comprising the steps of selecting data storage patterns on the disk drive based at least on one or more of said data transfer times per access pattern, to increase data transfer performance of the disk drive.

11. The method of claim 8, further comprising the steps of selecting a buffer size for each data transfer rate based at least one or more of the adjusted virtual buffer size values of that data transfer rate, to increase data transfer performance of the disk drive.

12. The method of claim 1, wherein:
step (a) further includes specifying each access pattern to include one or more data transfer commands, wherein each command is for transferring one or more data blocks from/to the storage device;
step (b) further includes the steps of maintaining an adjustable virtual buffer size value corresponding to each required data transfer rate; and
step (c) for each access pattern further includes the steps of, for each data transfer command for that access pattern:
measuring the actual data transfer time of the storage device to transfer data blocks for that command;
for each data transfer rate:
determining the amount of data transfer required according to that required data transfer rate during the data transfer time of that transfer command;
determining the difference between the required amount of data transfer and the actual amount of data transferred according to transfer command; and adjusting the virtual buffer size value for that data transfer rate based on said difference.

13. The method of claim 12, wherein a buffer selected based on one or more of the adjusted virtual buffer size values for each data transfer rate per access pattern, allows streaming data to/from the storage device via the buffer at least at that required data transfer rate for that access pattern.

14. The method of claim 1, wherein the storage device comprises rotatable media for storing data.

15. The method of claim 14, wherein the step of specifying each access pattern further includes the steps of: specifying parameters including location of data in the storage media for transfer.

16. The method of claim 15, wherein at least one access pattern comprises sequential access for transferring data to/from at least one contiguous location on the media.

17. The method of claim 15, wherein at least one access pattern comprises multiple stream access for transferring data to/from different locations on the media for each data stream.

18. The method of claim 17, wherein the data streams are interleaved in time and location.

19. The method of claim 17, wherein the multiple stream access comprises a multiple random stream access for transferring data to/from different locations on the media for each data stream.

20. The method of claim 17, wherein the multiple stream access comprises a dual stream access for transferring data to/from different locations on the media for each of the two data streams.

21. The method of claim 14, wherein the storage device comprises a disk drive including at least one data disk having multiple concentric data tracks thereon for storing data, and at least one transducer radially moveable relative to said data tracks by an actuator for transferring data to/from the concentric data tracks.

22. The method of claim 1, wherein each of the required data transfer rates is a constant data streaming rate to/from the storage device.

23. An apparatus for measuring performance of a storage device for transferring data to/from the storage device according to one or more access patterns in relation to one or more data transfer rates, each access pattern including one or more data transfer commands for transferring data to/from the storage device, comprising:
(a) a storage device interface for communicating with the storage device;
(b) control means for issuing each transfer command per access pattern to the storage device via the storage device interface;
(c) timing means for measuring the actual data transfer time of the storage device for transferring data according to each command; and
(d) processing means for determining performance of the storage device for each transfer command per access pattern in relation to each data transfer rate, as a function of that required data transfer rate and the actual data transfer time of that transfer command.

24. The apparatus of claim 23, wherein the processing means further includes:
means for determining the amount of data transfer required according to each data transfer rate during the actual data transfer time of each transfer command per access pattern; and
means for determining performance of the storage device for each data transfer rate for each transfer command per access pattern as a function of: (1) the actual data transfer time for that transfer command, and (2) that required data transfer rate and said amount of data transfer required for that data transfer rate.

25. The apparatus of claim 23, wherein the processing means further includes:
   means for determining the amount of data transfer required according to each data transfer rate during the actual data transfer time of each transfer command per access pattern; and
   means for determining, for each data transfer rate:
      the difference between the required amount of data transfer for that data transfer rate and the actual amount of data transferred, during said actual data transfer time for each transfer command per access pattern; and
      the performance of the storage device as a function of said difference.

26. The apparatus of claim 23 further comprising means for maintaining an adjustable virtual buffer size value corresponding to each required data transfer rate, and wherein the processing means further includes:
   means for determining the amount of data transfer required according to each data transfer rate during the actual data transfer time of each transfer command per access pattern; and
   means for determining, for each data transfer rate:
      the difference between the required amount of data transfer or that data transfer rate and the actual amount of data transferred, during said actual data transfer time for each transfer command per access pattern; and
      adjusting the virtual buffer size value for that data transfer rate based on said difference.

27. The apparatus of claim 23, wherein a buffer selected based on one or more of the adjusted virtual buffer size values for each data transfer rate per access pattern, allows streaming data to/from the storage device via the buffer at least at that required data transfer rate for that access pattern.

28. The apparatus of claim 23, wherein the storage device comprises rotatable media for storing data.

29. The apparatus of claim 28, wherein each access pattern includes parameters location of data in the storage media for transfer.

30. The apparatus of claim 29, wherein at least one access pattern comprises sequential access for transferring data to/from at least one contiguous location on the media.

31. The apparatus of claim 29, wherein at least one access pattern comprises multiple stream access for transferring data to/from different locations on the media for each data stream.

32. The apparatus of claim 31, wherein the data streams are interleaved in time and location.

33. The apparatus of claim 32, wherein the multiple stream access comprises a multiple random stream access for transferring data to/from different locations on the media for each data stream.

34. The apparatus of claim 32, wherein the multiple stream access comprises a dual stream access for transferring data to/from different locations on the media for each of the two data streams.

35. The apparatus of claim 33, wherein the storage device comprises a disk drive including at least one data disk having multiple concentric data tracks thereon for storing data, and at least one transducer radially moveable relative to said data tracks by an actuator for transferring data to/from the concentric data tracks.

36. The apparatus of claim 23, wherein each of the required data transfer rates is a constant data streaming rate to/from the storage device.

37. A computer program product for use with a computer system including a central processing unit (CPU), memory, and interface to a storage device, for measuring performance of the storage device for transferring data to/from the storage device according to one or more access patterns in relation to one or more data transfer rates, each access pattern including one or more data transfer commands for transferring data to/from the storage device, the computer program product comprising:
   a computer-readable medium;
   means, provided on the computer-readable medium, for issuing each transfer command per access pattern to the storage device via the storage device interface;
   means, provided on the computer-readable medium, for measuring the actual data transfer time of the storage device for transferring data according to each command; and
   means, provided on the computer-readable medium, for determining performance of the storage device for each transfer command per access pattern in relation to each data transfer rate, as a function of that required data transfer rate and the actual data transfer time of that transfer command.

38. The computer readable medium of claim 37, further comprising means, provided on the computer-readable medium, for determining the amount of data transfer required according to each data transfer rate during the actual data transfer time of each transfer command per access pattern;
   wherein said means for determining performance of the storage device further includes means for determining performance of the storage device for each data transfer rate for each transfer command per access pattern as a function of: (1) the actual data transfer time for that transfer command, and (2) that required data transfer rate and said amount of data transfer required for that data transfer rate.

39. The computer readable medium of claim 37 further comprising means, provided on the computer readable medium, for determining the amount of data transfer required according to each data transfer rate during the actual data transfer time of each transfer command per access pattern;
   wherein said means for determining performance of the storage device, further includes means for determining, for each data transfer rate:
      the difference between the required amount of data transfer for that data transfer rate and the actual amount of data transferred, during said actual data transfer time for each transfer command per access pattern; and
      the performance of the storage device as a function of said difference.

40. The computer readable medium of claim 37 further comprising means, provided on the computer readable medium, for maintaining an adjustable virtual buffer size value corresponding to each required data transfer rate;
   wherein said means for determining performance of the storage device, further includes:
      means for determining the amount of data transfer required according to each data transfer rate during the actual data transfer time of each transfer command per access pattern; and means for determining, for each data transfer rate:
    the difference between the required amount of data transfer or that data transfer rate and the actual amount of data transferred, during said actual data transfer time for each transfer command per access pattern; and
    adjusting the virtual buffer size value for that data transfer rate based on said difference;

wherein a buffer selected based on one or more of the adjusted virtual buffer size values for each data transfer rate per access pattern, allows streaming data to/from the storage device via the buffer at least at that required data transfer rate for that access pattern.

* * * * *